US012398873B2

(12) United States Patent
Yu

(10) Patent No.: US 12,398,873 B2
(45) Date of Patent: Aug. 26, 2025

(54) CHRISTMAS TREE STRING LIGHTS STAND

(71) Applicant: Shenzhen Shuyou Trading Co., Ltd., Shenzhen (CN)

(72) Inventor: Hui'e Yu, Shenzhen (CN)

(73) Assignee: Huizhou Xinshu Arts & Crafts Co., Ltd., Huizhou (CN)

(*) Notice: Subject to any disclaimer, the term of this patent is extended or adjusted under 35 U.S.C. 154(b) by 0 days.

(21) Appl. No.: 19/054,760

(22) Filed: Feb. 14, 2025

(65) Prior Publication Data

US 2025/0189113 A1 Jun. 12, 2025

(30) Foreign Application Priority Data

Jan. 15, 2025 (CN) ........................ 202520103071.8

(51) Int. Cl.
*F21V 23/06* (2006.01)
*F21V 21/02* (2006.01)

(52) U.S. Cl.
CPC .............. *F21V 23/06* (2013.01); *F21V 21/02* (2013.01)

(58) Field of Classification Search
CPC .................... A47G 33/06; A47G 33/08; A47G 2033/0827; A47G 2200/08; F21V 23/002; F21W 2121/04
See application file for complete search history.

(56) References Cited

U.S. PATENT DOCUMENTS

| | | | | |
|---|---|---|---|---|
| 6,588,914 B1 * | 7/2003 | Tang | F21S 4/10 | 362/249.19 |
| 8,870,404 B1 * | 10/2014 | Chen | F21S 4/10 | 362/249.02 |
| 9,700,169 B2 * | 7/2017 | Wong | F21S 4/20 | |
| 2014/0268689 A1 * | 9/2014 | Chen | H01R 33/92 | 29/876 |
| 2018/0269641 A1 * | 9/2018 | Ding | H01R 31/02 | |
| 2022/0052497 A1 * | 2/2022 | Ding | H01R 31/00 | |

* cited by examiner

*Primary Examiner* — Evan P Dzierzynski
(74) *Attorney, Agent, or Firm* — Murray, Ziel & Johnston; Aaron Powell

(57) ABSTRACT

A Christmas tree string lights stand includes a first bracket and a second bracket. The first bracket is provided with at least one first terminal, and the second bracket is provided with at least one second terminal. One first terminal is provided with a first metal sheet, and one second terminal is provided with a second metal sheet. The first metal sheet is connected to a first wire extending to an outside of the first terminal, the second metal sheet is connected to a second wire extending to an outside of the second terminal. The first wire is provided with a first interface and a second interface, and the second wire is provided with a third interface. The first terminal is plugged into the second terminal so that the first metal sheet is in contact with the second metal sheet.

8 Claims, 4 Drawing Sheets

CHRISTMAS TREE STRING LIGHTS STAND

CROSS-REFERENCE TO RELATED APPLICATIONS

The present application claims the benefit of Chinese Patent Application No. 2025201030718 filed on Jan. 15, 2025, the contents of which are hereby incorporated by reference.

TECHNICAL BACKGROUND

With the improvement of life quality, people improve the beauty of the environment by creating a festive atmosphere and decorating their houses to satisfy their spiritual enjoyment. For example, at Christmas time, people will decorate Christmas trees indoors and hang strings lights on the Christmas trees to create a festive atmosphere.

However, the string lights currently arranged on the Christmas tree are independent of each other, and different string lights need to be connected to different power supplies, which will result in messy distribution of multiple power cords and low indoor cleanliness.

INVENTION CONTENT

In order to overcome the defects of the existing technology, the present invention provides a Christmas tree string lights stand. The Christmas tree string lights stand can avoid the messy distribution of multiple power cords, reduce the time for users to organize the power cords, and improve the cleanliness of the indoor environment.

The technical scheme adopted by the present invention for solving the technical problems is as follows:

A Christmas tree string lights stand includes a first bracket and a second bracket. The first bracket is provided with at least a first terminal, and the second bracket is provided with at least a second terminal. The first terminal is provided with a connection slot. A first metal sheet is arranged on a side wall of the connection slot. The second terminal is provided with a connection block. The connection block is provided with a second metal sheet. A notch is arranged on the connection block, and the second metal sheet is exposed along the notch to an outer surface of the connection block. And the connection block is inserted into the connection slot to connect the first terminal with the second terminal.

Further, the first metal sheet is connected to a first wire extending to an outside of the first terminal, and the second metal sheet is connected to a second wire extending to an outside of the second terminal. The first wire is provided with a first interface and a second interface, and the second wire is provided with a third interface. The first terminal can be plugged into the second terminal so that the first metal sheet is in contact with the second metal sheet.

Further, the connection slot is provided with at least a limited block. The connection block is provided with at least a limited slot adapted to the limited block.

Further, a locating block is arranged in the connection slot, a locating slot is arranged on the connection block, and the locating block can be snap-connected with the locating slot.

Further, the first bracket and the second bracket are respectively configured as a hollow tubular structure.

Further, the first bracket is provided with a first connector, and two first terminals are symmetrically arranged on the first connector. The second bracket is provided with a second connector, and two second terminals are symmetrically arranged on the second connector.

Further, a connection tube is arranged at one end of the first bracket. An inserting part is arranged at one end of the second bracket. The outer diameter of the inserting part is adapted to the inner diameter of the connection tube.

Further, the connection tube and the first bracket are integrally formed, and the inserting part and the second bracket are integrally formed.

The beneficial effects of the present invention:

The present invention provides a Christmas tree string lights stand, which can connect the string lights together, and can power multiple string lights through only one power interface to glow, so as to avoid the messy distribution of multiple power cords, reduce the time for users to organize the power cords, and improve the cleanliness of the indoor environment. In actual applications, the Christmas tree stand also includes decorative leaves, and the string lights are arranged on the surfaces of the decorative leaves to make the overall ornamental of the Christmas tree better.

DESCRIPTION OF MARKS IN FIGURES

Figure 1:
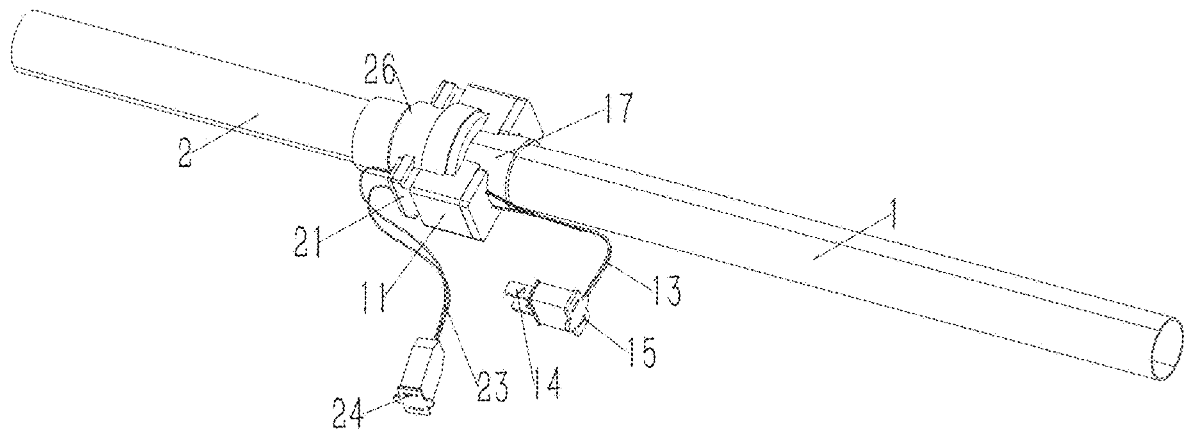
FIG. 1 is a schematic view of a Christmas tree stand in Embodiment I of the present invention.
Figure 2:
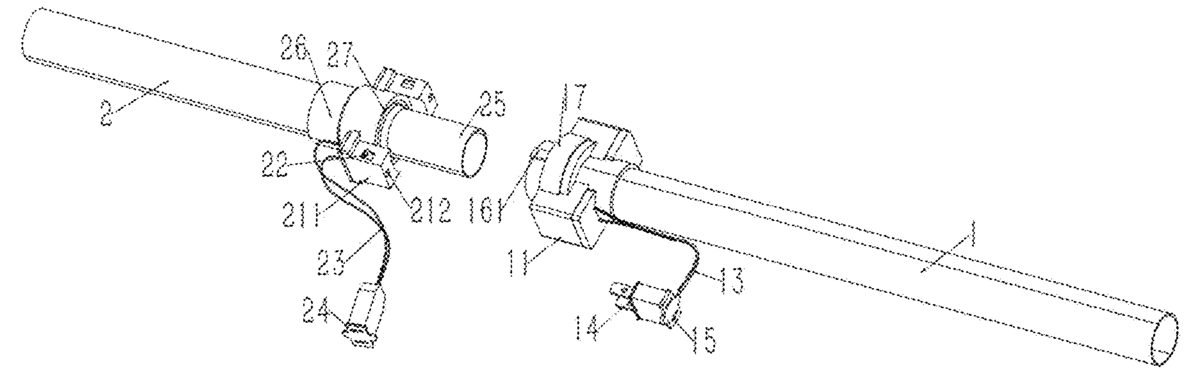
FIG. 2 is an exploded view of the Christmas tree stand in Embodiment I of the present invention.
Figure 3:
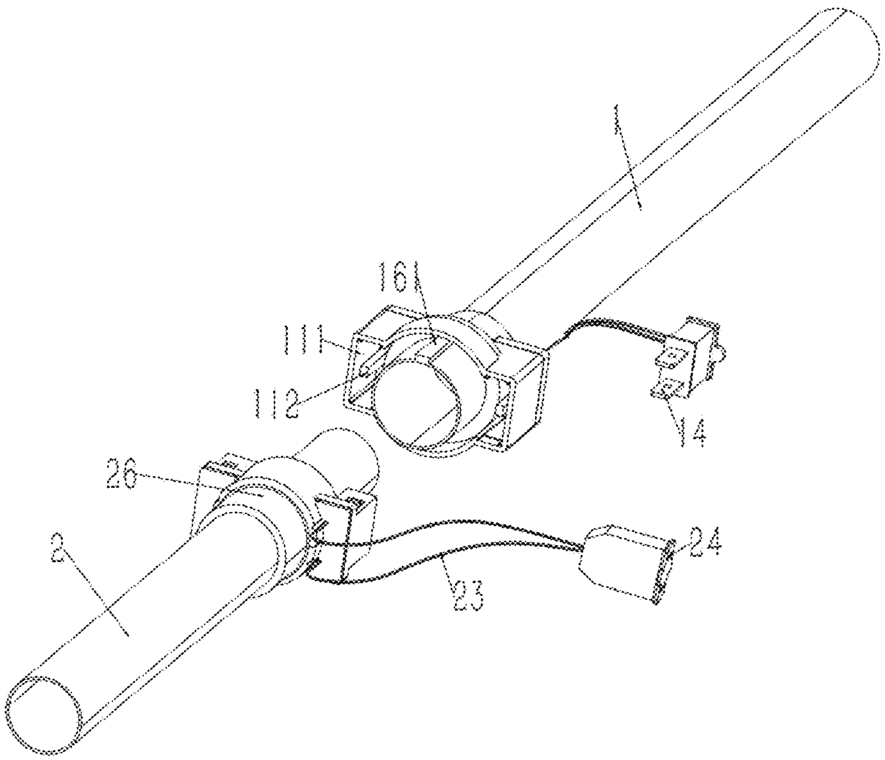
FIG. 3 is an exploded view of the Christmas tree stand in another angle in Embodiment I of the present invention.
Figure 4:
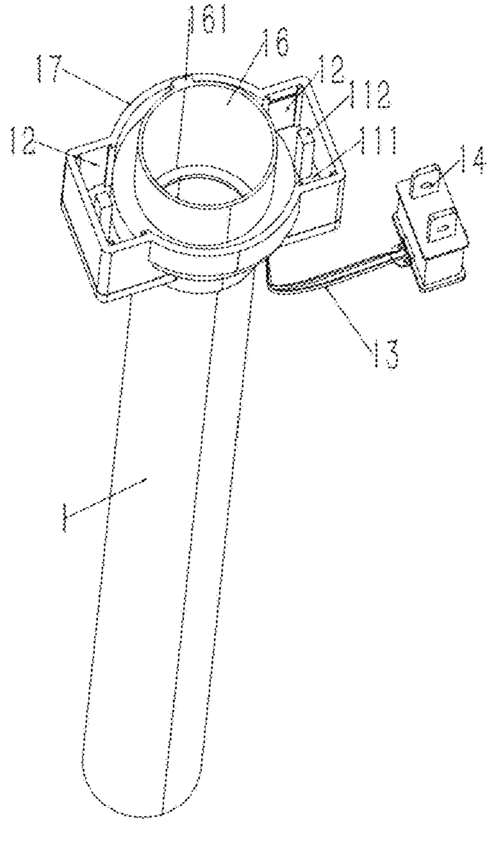
FIG. 4 is a schematic view of a first bracket in Embodiment I of the present invention.

1—first bracket; 11—first terminal; 111—connection slot; 112—limited block; 12—first metal sheet; 13—first wire; 14—first interface; 15—second interface; 16—connection tube; 161—locating block; 17—first connector;

2—second bracket; 21—second terminal; 211—connection block; 212—limited slot; 22—second metal sheet; 23—second wire; 24—third interface; 25—inserting part; 26—second connector; 27—locating slot.

DETAILED DESCRIPTION OF THE EMBODIMENTS

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to"

another element, it can be directly connected to the other element or indirectly connected to the other element.

It should be noticed that the terms “length”, “width”, “above”, “below”, “front”, “rear”, “left”, “right”, “vertical”, “horizontal”, “top”, “bottom”, “inside” and “outside” which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it cannot be understood as a limitation of the present invention.

In addition, the terms “first” and “second” are used for descriptive purposes only and cannot be understood as indicating or implying relative importance or implicitly indicating the quantity of indicated technical features. Therefore, a feature defined as “first” and “second” may explicitly or implicitly include one or more of these features. In the description of the present invention, “a plurality of” means two or more, unless otherwise specifically defined.

Embodiment I

Referring to FIGS. 1 to 4, the present embodiment provides a Christmas tree string lights stand, which can connect the string lights together, and can power multiple light strings through only one power interface to glow, so as to avoid the messy distribution of multiple power cords, reduce the time for users to organize the power cords, and improve the cleanliness of the indoor environment.

Specifically, the Christmas tree stand includes a first bracket 1 and a second bracket 2. The first bracket 1 is provided with at least a first terminal 11, and the second bracket 2 is provided with at least a second terminal 21. The first terminal 11 is provided with a connection slot 111. A first metal sheet 11 is arranged on a side wall of the connection slot 111. The second terminal 21 is provided with a connection block 211. The connection block 211 is provided with a second metal sheet 22. A notch is arranged on the connection block 211, and the second metal sheet 22 is exposed along the notch to an outer surface of the connection block 211. And the connection block 211 is inserted into the connection slot 111 to connect the first terminal 11 with the second terminal 21.

Understandably, the first interface 14 is used to connect an external power source, and the second interface 15 and the third interface 24 are used to connect string lights. When the first interface 14 is connected to an external power source, and the first terminal 11 is plugged into the second terminal 21, so that the first metal sheet 12 and the second metal sheet 22 are in contact and conductive. At this time, the first wire 13 can transmit the power supply voltage to the second wire 23, and the string lights connected to the second interface 15 and the third interface 24 can glow at the same time. Users can power two string lights by connecting the power source with only one power line.

Two ends of the first bracket 1 are provided with first terminals 11, and two ends of the second bracket 2 are provided with second terminals 21. The drawings of this embodiment are for illustration only and are not drawings of actual products.

For the convenience of description, two first brackets 1 and one second bracket 2 are taken as an example for explanation. The two first brackets 1 are respectively set as a head end bracket and an end bracket, and the second bracket 2 is set as a middle end bracket. The first terminal 11 on the head end bracket is connected to the external power supply and is plugged into the middle end bracket, and the second terminal 21 on other end of the middle end bracket is plugged into the first terminal 11 of the end bracket. The head end bracket, the end bracket and the middle end bracket are all connected with string lights.

It can be seen that multiple groups of first brackets 1 and second brackets 2 can be plugged together, and then the wires and metal guides of adjacent brackets can be connected through different string lights, so that one power cord can power multiple string lights.

Preferably, the first metal sheet 12 is connected to a first wire 13 extending to an outside of the first terminal 11, and the second metal sheet 22 is connected to a second wire 23 extending to an outside of the second terminal 21. The first wire 13 is provided with a first interface 14 and a second interface 15, and the second wire 15 is provided with a third interface 24. The first terminal 11 can be plugged into the second terminal 21 so that the first metal sheet 12 is in contact with the second metal sheet 22.

When the connection block 211 is inserted into the connection slot 111, the second metal sheet 22 can contact the first metal sheet 12 to conduct electricity.

Further, the connection slot 111 is provided with at least a limited block 112. The connection block 211 is provided with at least a limited slot 212 adapted to the limited block 112.

When the first terminal 11 is plugged into the second terminal 21, the limited slot 212 and the limited block 112 fit tightly together, which can ensure the stability of the connection between the terminals, so as to ensure that the first metal sheet 12 and the second metal sheet 22 are in continuous contact without poor contact.

Figure 5:
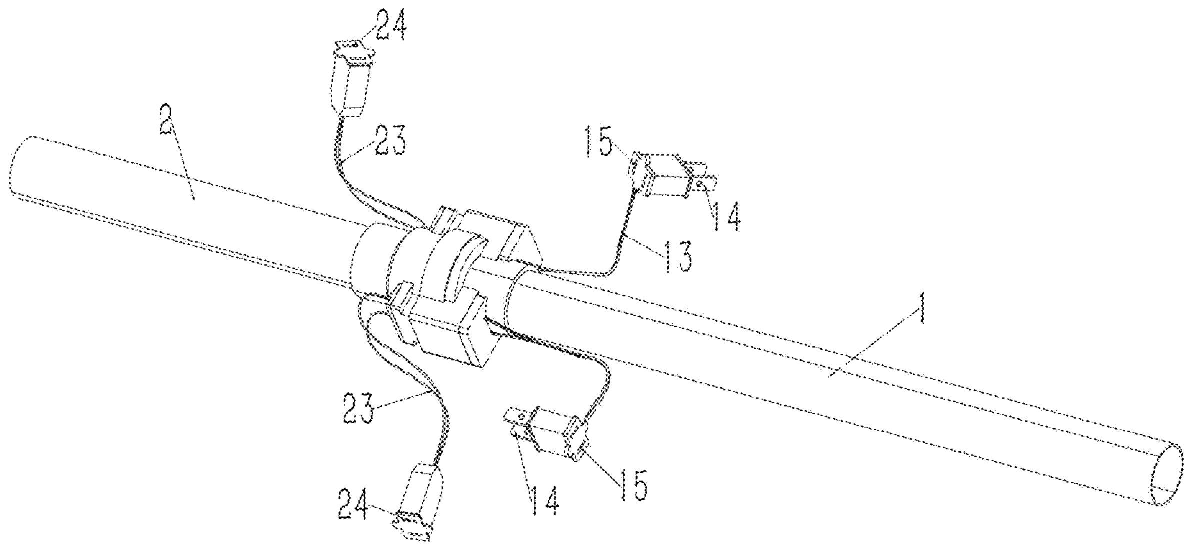
FIG. 5 is a schematic view of another state of the Christmas tree stand in Embodiment I of the invention.

Referring to FIG. 5, in Embodiment I, the first bracket 1 is provided with a first connector 17, and two first terminals 11 are symmetrically arranged on the first connector 17. The second bracket 2 is provided with a second connector 26, and two second terminals 21 are symmetrically arranged on the second connector 26.

By arranging two terminals on one connector, two sets of string light systems can be arranged on two sides of the stand at the same time to create a better sense of atmosphere.

Preferably, a connection tube 16 is arranged at one end of the first bracket 1, and an inserting part 25 is arranged at one end of the second bracket 2. The outer diameter of the inserting part 25 is adapted to the inner diameter of the connection tube 16.

When the first terminal 11 on the first bracket 1 is plugged into the second terminal 21 on the second bracket 2, the inserting part 25 on the second bracket 2 is inserted into the connection tube 16 on the first bracket 1. By arranging a double plug-in structure, the connection can be further ensured to be stable.

Preferably, the first bracket 1 and the second bracket 2 are respectively configured as a hollow tubular structure, which can save production materials and reduce production costs.

Further, the connection tube 16 and the first bracket 1 are integrally formed, and the inserting part 25 and the second bracket 2 are integrally formed, which is convenient for production and processing.

It should be noted that the wires and terminals in this embodiment are suitable for high-voltage string lights composed of high-voltage LED lamp beads. The voltage of the high-voltage LED lamp beads is usually between 30 V to 60 V. The high-voltage string lights with high luminous efficiency can provide bright lighting effects for the Christmas tree. In addition, the high-voltage LED lamp beads can glow in a variety of colors, including red, green, blue, yellow, etc., and can also achieve color changes and flashing effects through the controller to make the decoration of the Christmas tree more colorful.

Embodiment II

Figure 6:
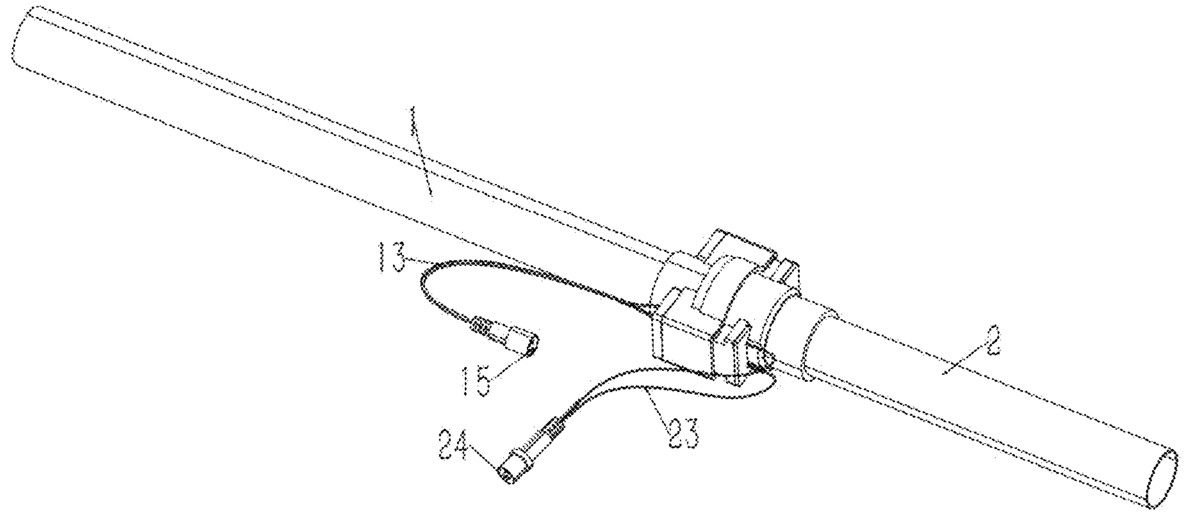
FIG. 6 is a schematic view of a Christmas tree stand in Embodiment II of the present invention.

Referring to FIG. 6, the difference between this embodiment and Embodiment I is that the wires and terminals in this embodiment are suitable for low-voltage string lights.

It should be noted that the voltage of low-voltage string lights is usually between 6 V to 24 V. Low-voltage string lights are cold light sources and do not generate high temperatures during operation, which can avoid safety hazards such as fires caused by high temperatures. In addition, the use of low-voltage string lights is safer and can reduce the risk of electric shock.

The drawings of this embodiment use the connection of the middle bracket and the end bracket as an illustration. Therefore, the interface for connecting the power supply is not shown in the drawings.

The remaining features and advantages of Embodiment II are the same as those of Embodiment I.

Embodiment III

Figure 7:
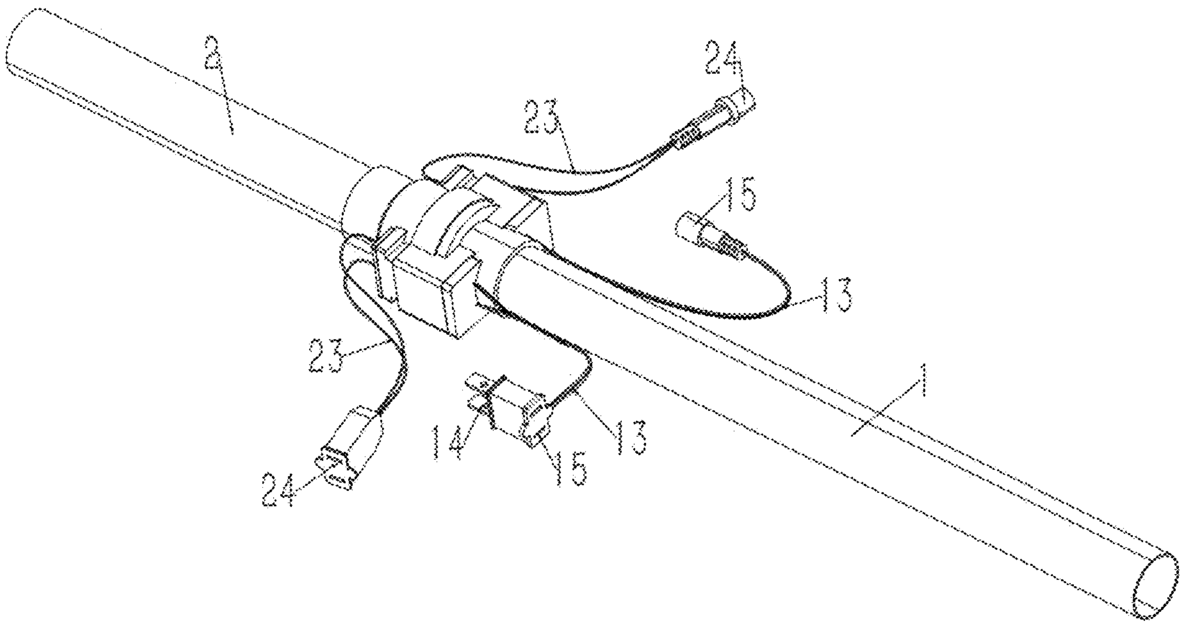
FIG. 7 is a schematic view of a Christmas tree stand in Embodiment III of the present invention.

Referring to FIG. 7, the difference between this embodiment and Embodiment I is that: the first bracket 1 is provided with two first terminals 11. One of the two first terminals 11 and the first wire 13 are suitable for a low-voltage string light, and other first terminal 11 and the first wire 13 are suitable for a high-voltage string light; the second bracket 2 is provided with two second terminals 21. One of the two second terminals 21 and the first wire 13 are suitable for a low-voltage string light, and other second terminal 21 and the second wire 13 are suitable for a high-voltage string light.

Understandably, when the first terminal 11 and the second terminal 21 are plugged into each other, the stand of this embodiment has two sets of string light systems, which can meet the usage scenarios of low-voltage string lights and high-voltage string lights at the same time, so as to meet the different usage needs of users.

Further, a locating block 161 is arranged on the outer periphery of the connection tube 16 of the first bracket 1. A locating slot 27 is arranged on the inner periphery of the second connector 26 on the second bracket 2. And the locating block 161 is adapted to the locating slot 27.

By setting the locating block 161 to cooperate with the locating slot 27, only when the two corresponding first terminals 11 and second terminals 21 are aligned can they be plugged into place to complete the installation work. Users should avoid plugging incompatible terminals together to protect the normal operation of the circuit.

The remaining features and advantages of Embodiment III are the same as those of Embodiment I.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

The invention claimed is:

1. A Christmas tree string lights stand comprises a first bracket and a second bracket, wherein the first bracket is provided with at least a first terminal; the second bracket is provided with at least a second terminal; the first terminal is provided with a connection slot; a first metal sheet is arranged on a side wall of the connection slot; the second terminal is provided with a connection block; the connection block is provided with a second metal sheet; a notch is arranged on the connection block, and the second metal sheet is exposed along the notch to an outer surface of the connection block; and the connection block is inserted into the connection slot to connect the first terminal with the second terminal.

2. The Christmas tree string lights stand according to claim 1, wherein the first metal sheet is connected to a first wire extending to an outside of the first terminal, and the second metal sheet is connected to a second wire extending to an outside of the second terminal; the first wire is provided with a first interface and a second interface, and the second wire is provided with a third interface; the first terminal can be plugged into the second terminal so that the first metal sheet is in contact with the second metal sheet.

3. The Christmas tree string lights stand according to claim 1, wherein the connection slot is provided with at least a limited block; the connection block is provided with at least a limited slot adapted to the limited block.

4. The Christmas tree string lights stand according to claim 1, wherein a locating block is arranged in the connection slot; a locating slot is arranged on the connection block, and the locating block can be snap-connected with the locating slot.

5. The Christmas tree string lights stand according to claim 1, wherein the first bracket and the second bracket are respectively configured as a hollow tubular structure.

6. The Christmas tree string lights stand according to claim 1, wherein the first bracket is provided with a first connector, and two first terminals are symmetrically arranged on the first connector; the second bracket is provided with a second connector, and two second terminals are symmetrically arranged on the second connector.

7. The Christmas tree string lights stand according to claim 1, wherein a connection tube is arranged at one end of the first bracket, and an inserting part is arranged at one end of the second bracket; an outer diameter of the inserting part is adapted to an inner diameter of the connection tube.

8. The Christmas tree string lights stand according to claim 7, wherein the connection tube and the first bracket are integrally formed; the inserting part and the second bracket are integrally formed.

* * * * *